United States Patent
Canoy et al.

(10) Patent No.: US 9,542,644 B2
(45) Date of Patent: Jan. 10, 2017

(54) METHODS AND APPARATUS FOR MODULATING THE TRAINING OF A NEURAL DEVICE

(71) Applicant: QUALCOMM Incorporated, San Diego, CA (US)

(72) Inventors: Michael-David Nakayoshi Canoy, San Diego, CA (US); Yinyin Liu, San Diego, CA (US); Anthony Sarah, San Diego, CA (US); Adrienne Milner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 14/079,181

(22) Filed: Nov. 13, 2013

(65) Prior Publication Data

US 2015/0052093 A1     Feb. 19, 2015

Related U.S. Application Data

(60) Provisional application No. 61/865,439, filed on Aug. 13, 2013.

(51) Int. Cl.
*G06N 3/08*     (2006.01)
*G06N 3/04*     (2006.01)

(52) U.S. Cl.
CPC .............. *G06N 3/08* (2013.01); *G06N 3/049* (2013.01)

(58) Field of Classification Search
None
See application file for complete search history.

(56) References Cited

U.S. PATENT DOCUMENTS 5,684,887 A * 11/1997 Lee .................. G06T 7/2053
                                                                 348/586
7,769,702 B2   8/2010 Messmer et al.
(Continued)

FOREIGN PATENT DOCUMENTS

EP        1650672 A2    4/2006

OTHER PUBLICATIONS

"STPD with adaptive synaptic delay for robot navigation control", Paolo Arena et al, Microtechnologies for the New Millennium. International Society for Optics and Photonics, Proc. SPIE 6592, Bioengineered and Bioinspired Systems III, 65920J, May 22, 2007, 10 pages.*

(Continued)

*Primary Examiner* — Wilbert L Starks
*Assistant Examiner* — Mai T Tran
(74) *Attorney, Agent, or Firm* — Patterson & Sheridan, L.L.P.

(57) ABSTRACT

Methods and apparatus are provided for training a neural device having an artificial nervous system by modulating at least one training parameter during the training. One example method for training a neural device having an artificial nervous system generally includes observing the neural device in a training environment and modulating at least one training parameter based at least in part on the observing. For example, the training apparatus described herein may modify the neural device's internal learning mechanisms (e.g., spike rate, learning rate, neuromodulators, sensor sensitivity, etc.) and/or the training environment's stimuli (e.g., move a flame closer to the device, make the scene darker, etc.). In this manner, the speed with which the neural device is trained (i.e., the training rate) may be significantly increased compared to conventional neural device training systems.

100 Claims, 16 Drawing Sheets

(56) References Cited

U.S. PATENT DOCUMENTS

| | | | |
|---|---|---|---|
| 8,095,485 B2 | 1/2012 | Curtis | |
| 8,290,885 B2 | 10/2012 | Sabe et al. | |
| 2007/0285040 A1 | 12/2007 | Jenner, Jr. | |
| 2008/0162391 A1* | 7/2008 | Izhikevich | G06N 3/049 706/25 |
| 2011/0066005 A1 | 3/2011 | Rotenberg | |
| 2012/0158178 A1* | 6/2012 | Hyung | B25J 9/1666 700/255 |
| 2014/0222739 A1* | 8/2014 | Ponulak | G06N 3/049 706/25 |
| 2014/0371907 A1* | 12/2014 | Passot | G06N 3/008 700/257 |

OTHER PUBLICATIONS

Drummond C., "Accelerating Reinforcement Learning by Composing Solutions of Automatically Identified Subtasks", Journal of Artificial Intelligence Research, Feb. 1, 2002 (Feb. 1, 2002), pp. 59-104, XP055176871, Retrieved from the Internet: URL:https://www.jair.org/media/904/live-904-2009-jair.pdf [retrieved on Mar. 16, 2015].

Grokop LH., et al., "Activity and device position recognition in mobile devices", Proceedings of the 13th International Conference on Ubiquitous Computing, Jan. 1, 2011 (Jan. 1, 2011), p. 591, XP055176387, DOI: 10.1145/2030112.2030228, ISBN: 978-1-45-030630-0.

International Search Report and Written Opinion—PCT/US2014/048605—ISA/EPO—Mar. 31, 2015.

Izhikevich EM., "Solving the Distal Reward Problem through Linkage of STDP and Dopamine Signaling", Cerebral Cortex, Jan. 13, 2007 (Jan. 13, 2007), pp. 1-10, XP007914378, ISSN: 1566-6816, DOI: 10.1093/CERCOR/BHL152 [retrieved on Jan. 13, 2007].

Weiler D., et al., "A Probabilistic Prediction Method for Object Contour Tracking", Sep. 2008 (Sep. 3, 2008), Artificial Neural Networks—ICANN 2008; [Lecture Notes in Computer Science], Springer Berlin Heidelberg, Berlin, Heidelberg, pp. 1011-1020, XP019106022, ISBN: 978-3-540-87535-2.

Wu Q., et al., "Motion Detection Using Spiking Neural Network Model", Sep. 15, 2008 (Sep. 15, 2008), Advanced Intelligent Computing Theories and Applications. With Aspects of Artificial Intelligence; [Lecture Notes in Computer Science], Springer Berlin Heidelberg, Berlin, Heidelberg, pp. 76-83, XP019104836, ISBN: 978-3-540-85983-3.

* cited by examiner

METHODS AND APPARATUS FOR MODULATING THE TRAINING OF A NEURAL DEVICE

CLAIM OF PRIORITY UNDER 35 U.S.C. §119

This application claims benefit of U.S. Provisional Patent Application Ser. No. 61/865,439, filed Aug. 13, 2013 and entitled "Methods and Apparatus for Modulating the Training of a Neural Device," which is herein incorporated by reference in its entirety.

BACKGROUND

Field

Certain aspects of the present disclosure generally relate to artificial nervous systems and, more particularly, to modulating the training of a neural device having such an artificial nervous system.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure generally relate to training a neural device having an artificial nervous system by modulating at least one training parameter during the training in an effort to decrease the amount of training time (i.e., increase the training rate).

Certain aspects of the present disclosure provide a method for training a neural device having an artificial nervous system. The method generally includes observing the neural device in a training environment and modulating at least one training parameter based at least in part on the observing.

Certain aspects of the present disclosure provide an apparatus for training a neural device having an artificial nervous system. The apparatus generally includes a processing system and a memory coupled to the processing system. The processing system is typically configured to observe the neural device in a training environment and to modulate at least one training parameter based at least in part on the observing.

Certain aspects of the present disclosure provide an apparatus for training a neural device having an artificial nervous system. The apparatus generally includes means for observing the neural device in a training environment, and means for modulating at least one training parameter based at least in part on the observing.

Certain aspects of the present disclosure provide a computer program product for training a neural device having an artificial nervous system. The computer program product generally includes a non-transitory computer-readable medium (e.g., a storage device) having instructions executable to observe the neural device in a training environment and to modulate at least one training parameter based at least in part on the observing.

Certain aspects of the present disclosure provide a method for training a neural device having an artificial nervous system. The method generally includes receiving, at the neural device, instructions to modulate at least one training parameter of the neural device and modulating the at least one training parameter based at least in part on the received instructions.

Certain aspects of the present disclosure provide an apparatus having an artificial nervous system. The apparatus generally includes a processing system and a memory coupled to the processing system. The processing system is typically configured to receive instructions to modulate at least one training parameter of the apparatus and to modulate the at least one training parameter based at least in part on the received instructions.

Certain aspects of the present disclosure provide an apparatus having an artificial nervous system. The apparatus generally includes means for receiving instructions to modulate at least one training parameter of the apparatus and means for modulating the at least one training parameter based at least in part on the received instructions.

Certain aspects of the present disclosure provide a computer program product for training a neural device having an artificial nervous system. The computer program product generally includes a non-transitory computer-readable medium (e.g., a storage device) having code for receiving, at the neural device, instructions to modulate at least one training parameter of the neural device and for modulating the at least one training parameter based at least in part on the received instructions.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
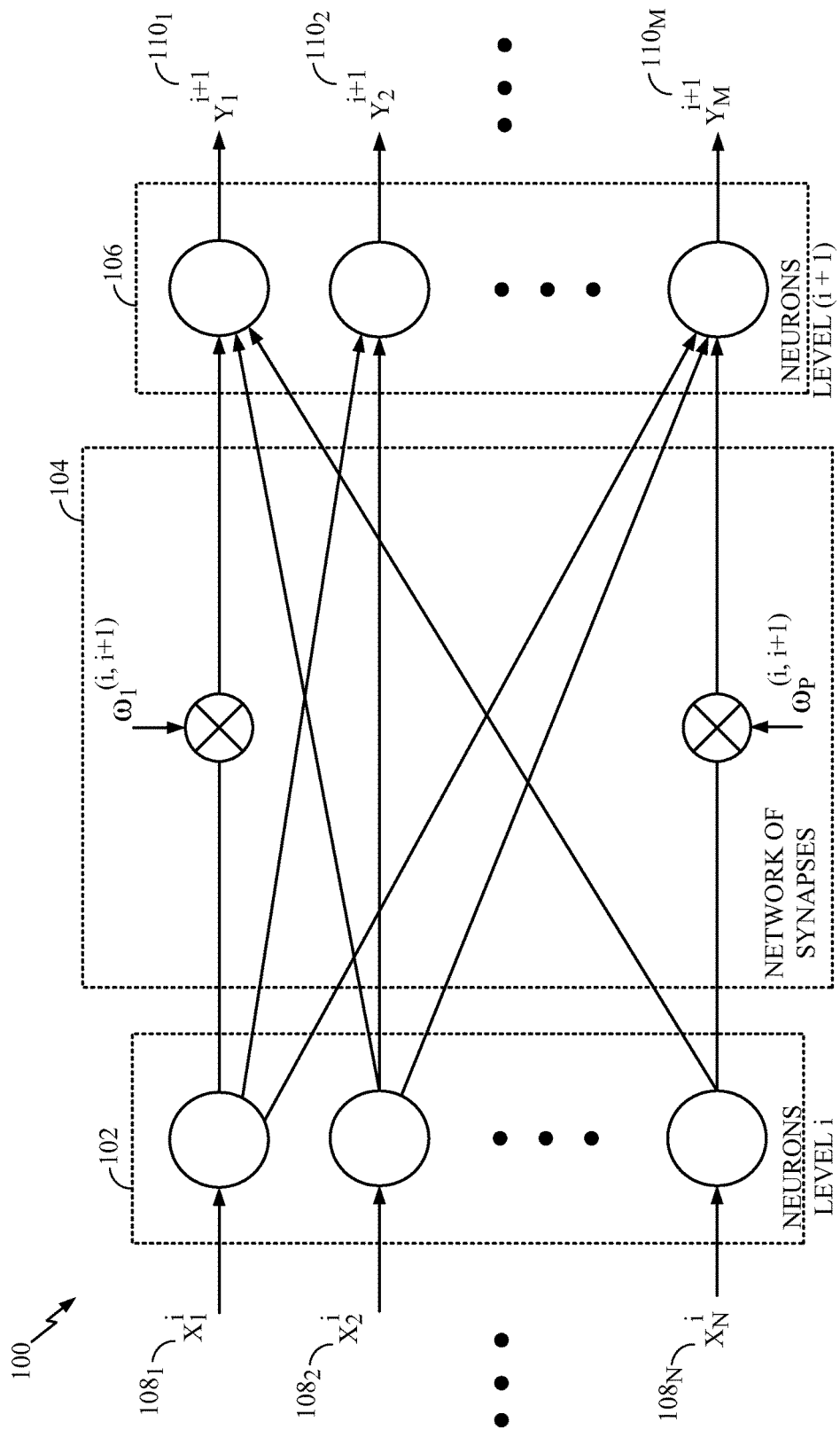
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory (depolarizing) or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
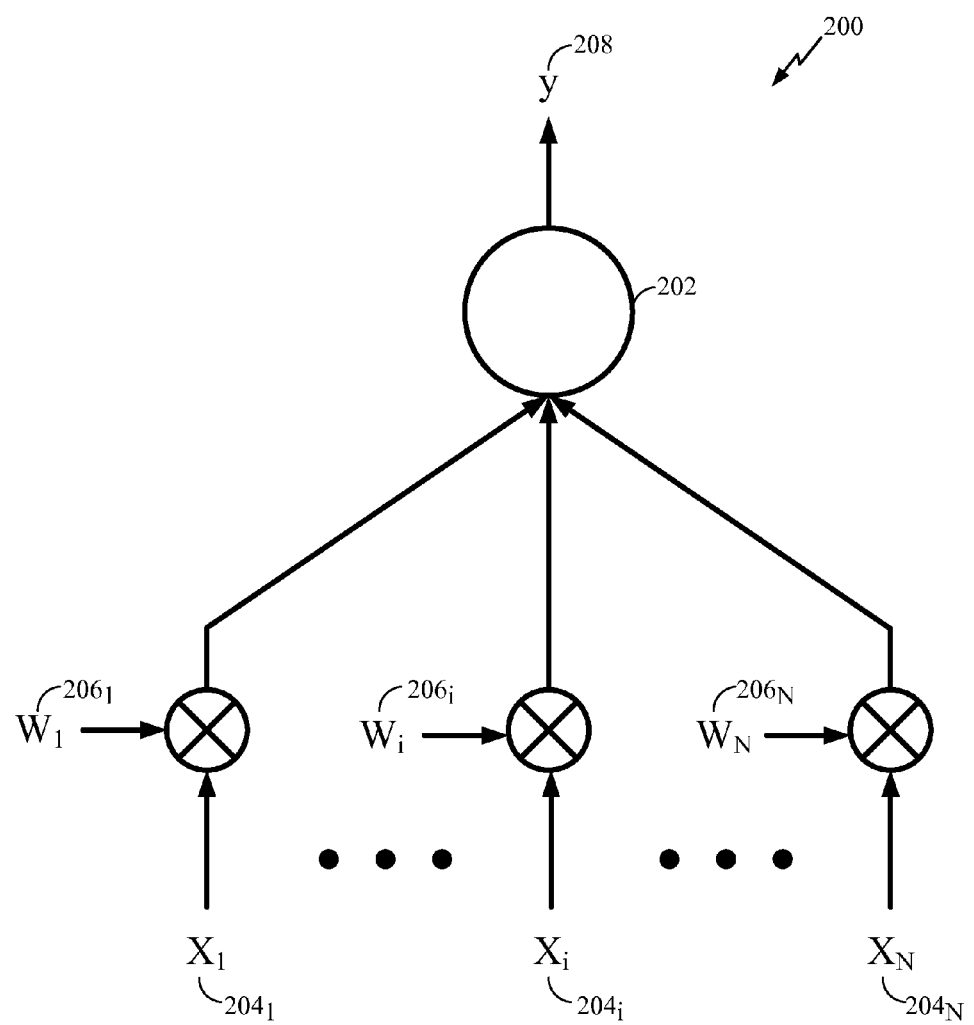
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights 2061-206N ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to) increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases} \tag{7}$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
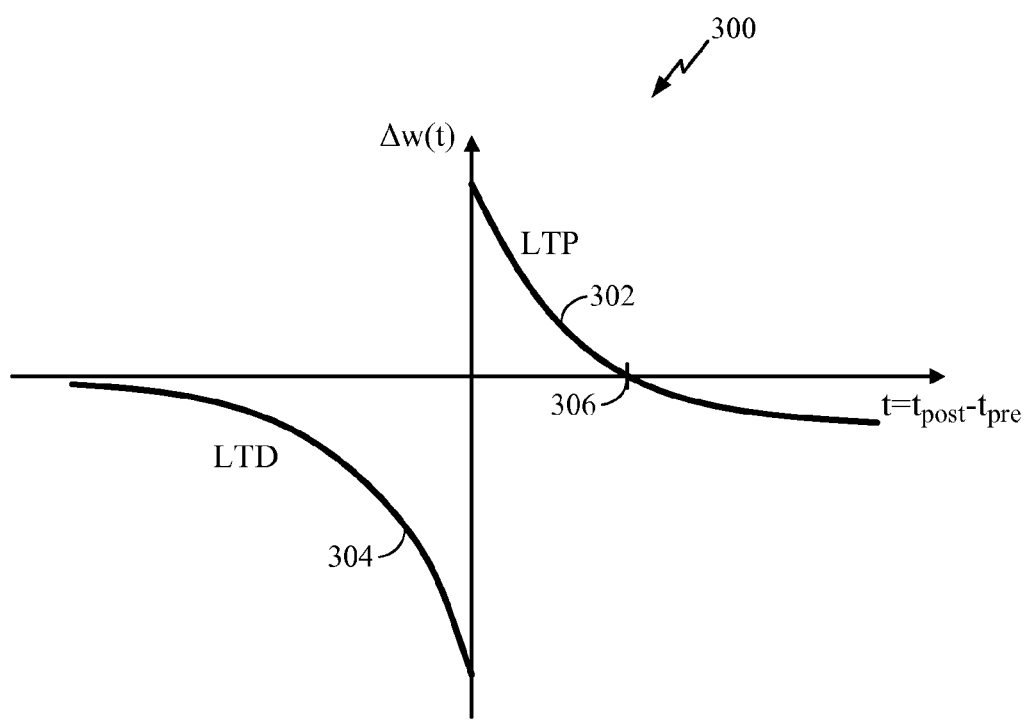
FIG. 3 illustrates an example spike-timing dependent plasticity (STDP) curve in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value μ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset μ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where α and β are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
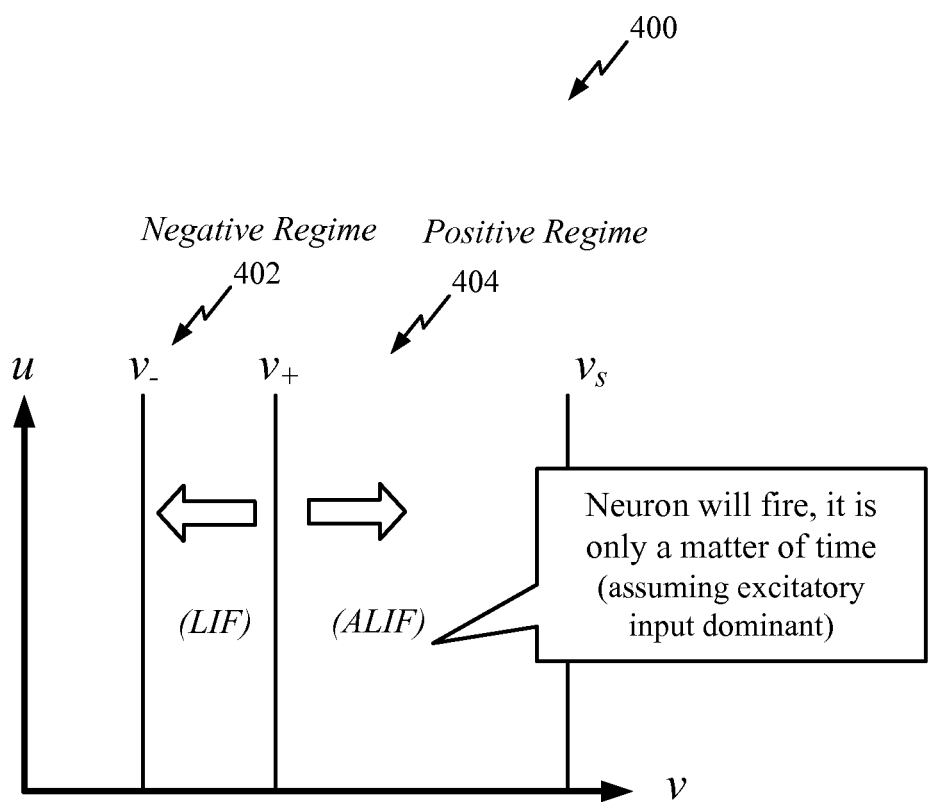
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest (v_) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol ρ is used herein to denote the dynamics regime with the convention to replace the symbol ρ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_S$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are $$v(t + \Delta t) = (v(t) + q_\rho)e^{\frac{\Delta t}{\tau_\rho}} - q_\rho \quad (11)$$

$$u(t + \Delta t) = (u(t) + r)e^{\frac{\Delta t}{\tau_u}} - r \quad (12)$$

Therefore, the model state may be updated only upon events such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state v reaches $v_S$, then the closed-form solution for the amount of time, or relative delay, until a spike occurs as measured from the time that the voltage is at a given state v is $$\Delta t_s = \begin{cases} \tau_+ \log \frac{v_s + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime $\rho$ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Meta-Plasticity Rule

The classic spike-timing-dependent-plasticity (STDP) rule relies solely on the spike timing difference between pre- and post-synaptic neurons. However, experimental evidence indicates that there are cases when timing alone is not sufficient in deciding synaptic plasticity rules. The data in Pawlak, V. et al., "Timing is not everything: neuromodulation opens the STDP gate," *Front. Synaptic Neurosci.* 2:1-13 (2010) indicates that synaptic plasticity is gated by modulatory signal dopamine (DA). The sign of the plasticity change is also affected by the state and concentration of the combination of neurotransmitters and receptors, as described in Shen, W. et al., "Dichotomous Dopaminergic Control of Striatal Synaptic Plasticity," *Science* 321: 848-850 (2008).

A meta-plasticity rule is described herein, where meta-plasticity generally refers to a change in the capacity to provoke subsequent synaptic plasticity, including long-term potentiation (LTP) and long-term depression (LTD). As a generalized synaptic plasticity rule, the meta-plasticity rule links the neuromodulation input, which possibly comes with delay, with the pre- and post-synaptic neuron activities.

The pre- and post-synaptic neuron activities result in eligibility traces similar to the scheme presented in Izhikevich, E. M., "Solving the Distal Reward Problem through Linkage of STDP and Dopamine Signaling," *Cerebral Cortex* 17:2443-52 (2007). But with the meta-plasticity rule, the potentiation p(t) and depression d(t) traces are separately expressed in Eq. (15) below, where the eligibility traces decay over time:

$$p(t) = p(t-1) - \frac{p(t-1)}{\tau_{trace}} + LTF(\tau)\delta(t - t_{pre/post}) \quad (15)$$

-continued
$$d(t) = d(t-1) - \frac{p(t-1)}{\tau_{trace}} + LTD(\tau)\delta(t - t_{pre/post})$$

where $\tau_{trace}$ is the time constant of the trace. The synaptic change may be represented as $$\Delta s(t) = \Delta w \cdot p(t) + \Delta w \cdot d(t) \quad (16)$$

Figure 16:
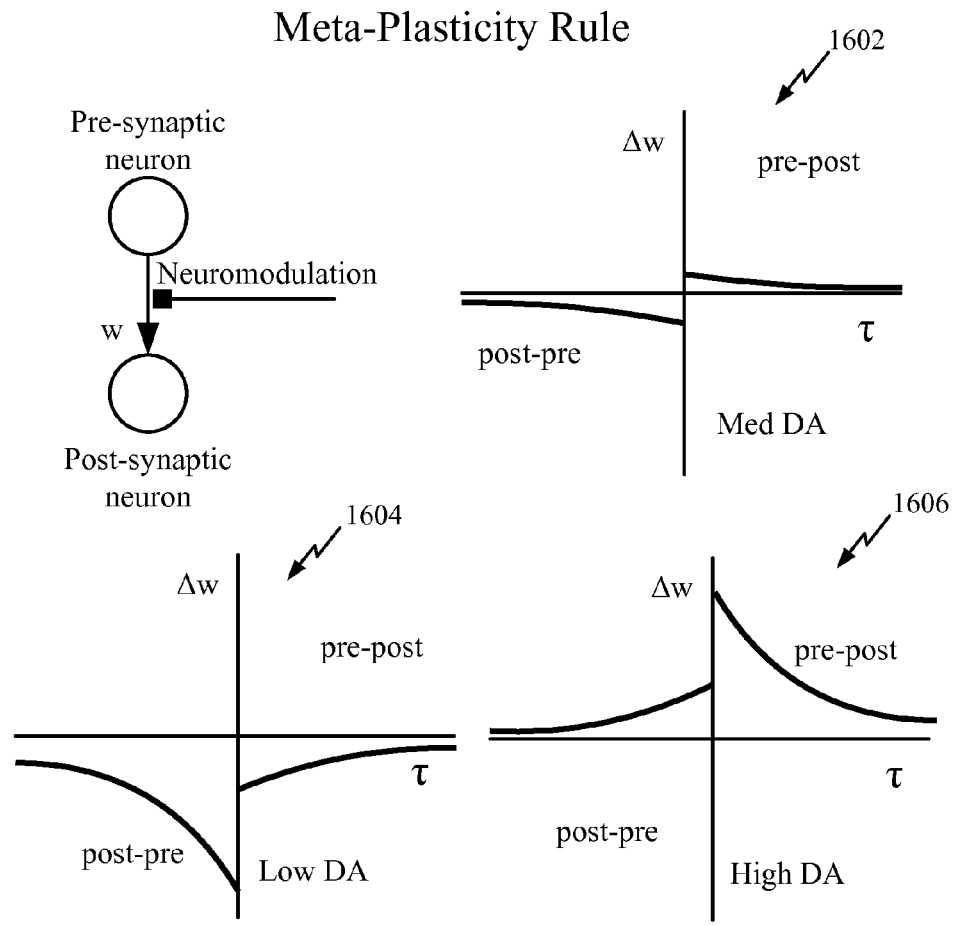
FIG. 16 graphically illustrates an example meta-plasticity rule stipulating three different modes depending on the level of neuromodulatory inputs, in accordance with certain aspects of the present disclosure.

In general, the meta-plasticity rule stipulates three neural activity modes depending on the level of neuromodulatory inputs, as illustrated in FIG. 16. A high DA level yields $\Delta w > 0$. As illustrated in the graph 1606 of FIG. 16, this modulates the learning rule into a Hebbian regime where positive $\Delta s(t)$ is applied to both pre-post and post-pre synaptic firing events, which leads to the strengthening of the synapse.

A low DA level yields $\Delta w < 0$. As illustrated in the graph 1604 of FIG. 16, this modulates the learning rule into an anti-Hebbian regime, where negative $\Delta s(t)$ is applied to both pre-post and post-pre synaptic firing events to weaken the synapse. Although the graphs 1604 and 1606 illustrate piecewise exponential functions, other functions (e.g., a square wave or piecewise rectangular functions) may be used instead for certain aspects.

A medium DA level induces little synaptic weight change, so $\Delta w \sim 0$, $\Delta s \sim 0$. The graph 1602 of FIG. 16 illustrates this nominal synaptic change for both pre-post and post-pre synaptic firing events for certain aspects. For other aspects, a flat, horizontal line (representing no updates) could be used instead for the medium DA level, rather than a piecewise exponential function (representing small updates), as illustrated in the graph 1602.

The meta-plasticity rule stipulates that a high DA level will enable synaptic potentiation, such that an artificial nervous system remembers the association. On the contrary, a low DA level will result in synaptic depression, such that the artificial nervous system actively forgets the current association quickly. Such a meta-plasticity rule is important in reward-learning, especially a reversal learning scheme. Prior learning systems use a passive decay mechanism to forget an association, which takes significantly longer than the active mechanism described herein for forgetting an association (i.e., for reversal learning). However, the active forgetting of the association need not be immediate; there may be some stability built in to the forgetting scheme.

This meta-plasticity learning rule is not limited to networks of spiking neurons. In a rate-based neural network, the eligibility traces are calculated using correlation between neuron responses, and the same rule applies to link the eligibility traces with the neuromodulation inputs.

Example Training of a Neural Device

Devices that utilize an artificial nervous system (e.g., a neuromorphic processor comprising a plurality of artificial neurons) are currently being developed. These neural devices mimic animal brain-like processing and leverage the artificial nervous system for the decision-making function. Such neural devices typically need training before performing a desired task.

Training a behavior into a neural device can take a long time. Therefore, accelerating the time it takes to learn a behavior becomes a cornerstone to a neural device's path to market. Modulating the device's learning rate is one way to shorten the training time, whether by accelerating the learning rate to more quickly learn new behaviors, retarding the learning rate to correct any unneeded behaviors, or any combination thereof. Modulation of the learning rate is limited from the vantage point of the neural device, which typically can only perceive the training environment with its sensors.

Accordingly, what is needed are techniques and apparatus for decreasing the training time, which may utilize an external entity to modulate various training parameters, including the device's learning rate. Such an external entity has a broader view of the training environment and of the neural device's learning capabilities.

Certain aspects of the present disclosure provide an adaptive system for training neural devices that may be automated and/or driven manually. Such an adaptive training system observes actions of the training environment and of the neural device, as well as interactions therebetween. The training system may also have the ability to affect various aspects of the training environment (e.g., change lighting, temperature, etc.) and the ability to affect various parts of the neural device, including the neural model(s) on which the artificial nervous system is based (e.g., adjust weights, delays, and neuromodulation).

According to certain aspects, the training system may provide for training of multiple neural devices. This allows one to amortize the time involved to train a behavior. For certain aspects, the training system may provide for training of multiple behaviors simultaneously, thereby increasing training efficiency.

Figure 5:
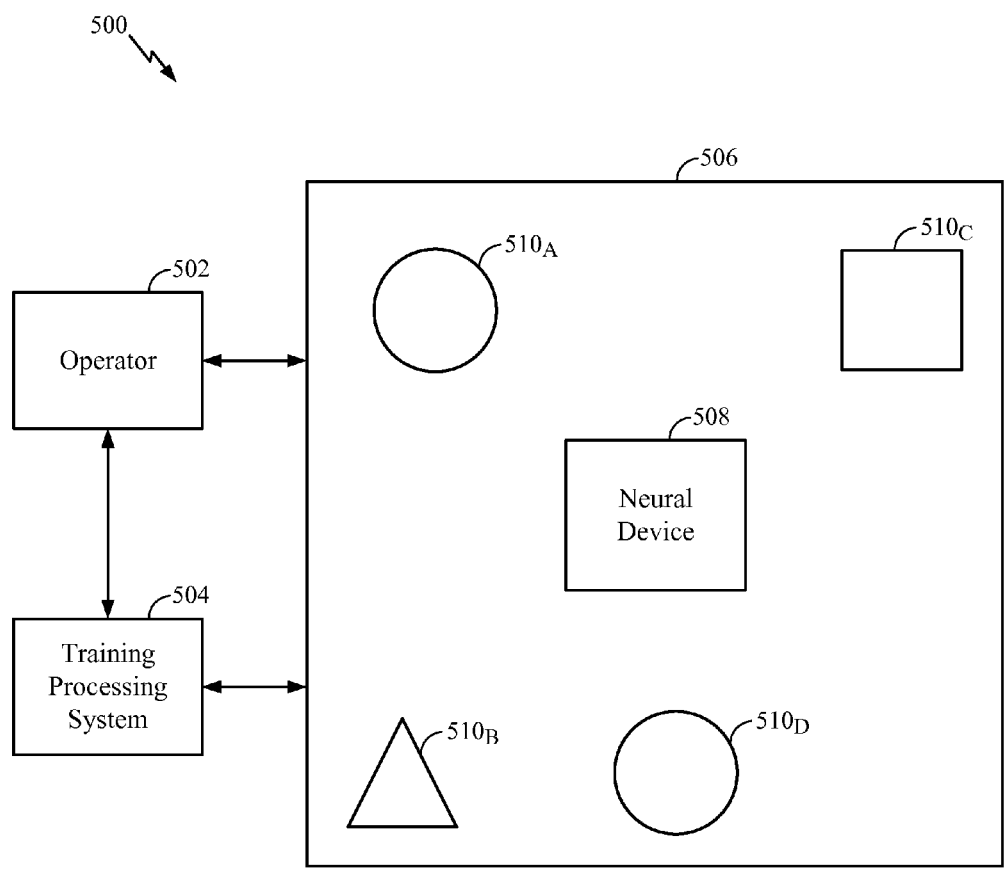
FIG. 5 is a block diagram of an example training system, in accordance with certain aspects of the present disclosure.

FIG. 5 is a block diagram of an example training system 500 for training a neural device 508, in accordance with certain aspects of the present disclosure. The training system 500 may involve interactions between an operator 502, a training processing system 504, and a training environment 506. The operator 502 may be a human, another animal (e.g., an ape or monkey), or a machine (e.g., another neural device, different than the neural device 508 being trained). The training processing system 504 may include one or more processing units and may be a computer, for certain aspects.

During the training process, the neural device 508 may be introduced into the training environment 506. The training environment 506 may contain one or more environmental stimuli 510, which may comprise any of various suitable stimulus types (e.g., objects in the training field, lights, sounds, smells, electromagnetic fields, images, heat, and the like), depending on what the neural device 508 is being expected to learn (e.g., based on the task to be performed). The training processing system 504 may interface with the neural device 508 and/or with the environmental stimuli 510 in the training environment 506 to modulate one or more training parameters during training of the neural device 508. These training parameters may include a learning factor of the neural device 508, such as a spiking rate, a learning rate, an amount or an effect of a neuromodulator, a capacity to provoke subsequent synaptic plasticity (e.g., according to the meta-plasticity rule), a sensitivity of a sensor associated with the neural device 508, a gain of a motor control or a control signal, a number of artificial neurons involved in the artificial nervous system, and/or a number of synaptic connections in the artificial nervous system. The learning factor may also include a time constant, a state, one or more coefficients, and/or one or more equations of a neural model for the neural device. The training parameters may also include environmental factors of the environmental stimuli 510, such as a location of an object, light intensity, image contrast, volume, chemical concentration, vibration, temperature, pressure, electrical noise, and the like.

According to certain aspects, the training process may be fully automated by the training processing system 504, while in other aspects, the operator 502 may interface with the training processing system to control or influence the training process. For certain aspects, the operator 502 may interact with the neural device and/or the environmental stimuli 510 (e.g., by relocating the neural device or an environmental stimulus, adding a new environmental stimulus, removing an existing stimulus, or powering on or off a stimulus), without interfacing with the training processing system 504. This interaction may be used, for example, to correct, improve, or make relatively large adjustments to the training process, rather than restarting the entire process.

Figure 6:
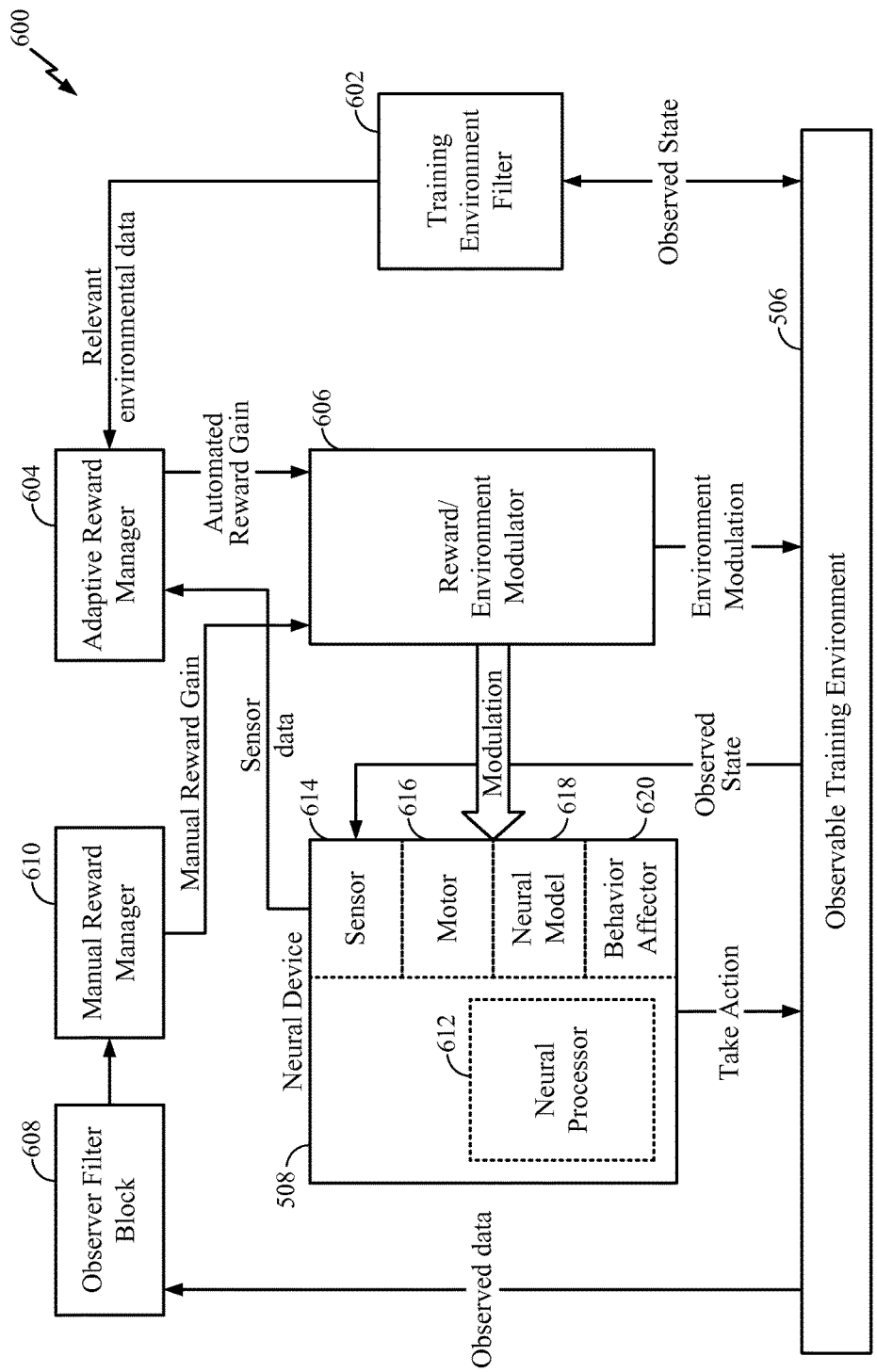
FIG. 6 is a detailed block diagram of an example modulated training system, in accordance with certain aspects of the present disclosure.

FIG. 6 is a detailed block diagram of an example modulated training system 600, in accordance with certain aspects of the present disclosure. The training system 600 may include an observable training environment 506, a training environment filter (TEF) 602, an adaptive reward manager (ARM) 604, and a reward/environment modulator (REM) 606 for providing an automated reward control aspect to the training process. The TEF 602, the ARM 604, and/or the REM 606 may be part of the training processing system 504. For certain aspects, the training system 600 may also include an observer filter block (OFB) 608 and a manual reward manager (MRM) 610 for providing an observer-based manual reward control aspect to the training process. The OFB 608 and/or the MRM may also be part of the training processing system 504. For certain aspects, the observer for the manual reward control aspect may be a non-automated training monitor (a person, monkey, etc.), such as an operator 502.

As illustrated in FIG. 6, the neural device 508 may include one or more neural processors 612, sensors 614, motors 616, and a neural model 618 (e.g., memory storing a neural model program, equations, and/or parameters), which regulates the behavior of the neural processor(s). The neural device 508 may also include a behavior affecter 620 (e.g., a co-processor). The behavior affecter 620 includes non-neurological logic that is used to direct neural processing, affects the neural processor(s) 612 through statistical models or other non-biological algorithms, and is a dynamic piece of the neural model.

To assist in describing the operation of the training system 600, one example use case involving training a robot (having the neural device 508) to avoid trash cans is described below. However, it is understood that the training system 600 may be used to train the neural device 508 to perform any desired task using any environmental stimuli (e.g., physical objects, fluids, lights, sounds, smells, electromagnetic fields, images, heat, pressure, vibration, humidity, air flow, and the like). The process of training the neural device 508 may involve several steps (e.g., observe, filter, reward, modulate, and act) that may be repeated until the neural device has been sufficiently trained.

The first training step (Observe) may involve three different entities: the robot (having the neural device 508), a human observer (or the OFB 608 in an automated training system), and the TEF 602. As the robot moves towards a trash can (an example environmental stimulus 510), the trash can gets larger in the field of view (FOV) of the robot. In other words, the observed state of the training environment 506 is sensed by the sensor(s) 614, and the neural device 508 in the robot may send a signal (indicating the sensor data) to the ARM 604. Similarly, the human observer (or the OFB 608) may notice that the robot is close to the trashcan. The TEF 602 may observe not only that the robot is approaching the trash can, but also other changes to the training environment 506, such as the robot moving farther from a tree.

In the second training step (Filter), the TEF 602 may send relevant environmental data (e.g., filtered information of "close to trashcan") to the ARM 604. The human observer (or the OFB 608) may send a stop command to the MRM 610.

In the third training step (Reward), the MRM 610 may receive the stop command and generate a manual reward gain. The ARM 604 may process the relevant environmental data and the sensor data from the neural device 508 in an effort to generate an automated reward gain.

In the fourth training step (Modulate), the REM 606 may combine or otherwise process the manual and automated rewards and translate the processed rewards into data streams understood by various parts of the neural device 508 (e.g., the sensor(s) 614, motor(s) 616, neural model 618, and behavior affecter 620) and by the training environment 506). In the fifth training step (Act), the modulation sent from the REM 606 may affect the robot's actions (i.e., the neural device 508 may signal taking an action, which may influence the observable training environment 506). For example, the robot may move away from the trashcan. In addition, environmental modulation (e.g., powering on lights, decreasing temperature, moving a physical object, and the like) by the REM 606 may affect the training environment 506. Then, the training steps may be repeated by returning to the first training step (Observe).

The TEF 602 (also known as the training environment monitor) may monitor the position, time, and history of the neural device 508, as well as obstacles in the environment. The TEF 602 may be automated. For example, if a collision is detected by the TEF 602, a reward influence may be sent to the ARM 604. The ARM may evaluate the reward influence and generate an automated reward gain that is provided to the REM 606. The REM may process the gains provided by the observer-based manual reward from the MRM 610 with the automated reward gain to generate the desired modulation implicated to affect the learning rate.

External and/or internal modulation may affect the neural device 508. Any of spiking rate, learning rate, neuromodulator activity, sensor sensitivity, and the like, or any combination thereof, may be adjusted. The neural device 508 may then take action in the training environment. This action may include, for example, moving, adjusting a sensor (e.g., redirecting or focusing), listening, using a camera, and the like.

If the neural device 508 contacts another object in the training environment 506, the training adapter (e.g., the REM 606) may modulate the learning rate. Various categories of modulation examples include, but are not limited to, the following: (1) external to neural device; (2) intra-neural device; and (3) non-biological modulations. External to neural device modulations include such stimuli as injecting spikes to a touch sensor (similar to petting a dog to reward good behavior). Intra-neural device modulation may include increasing the affect of a neuromodulator, growing or retarding a number of synaptic connections, and/or growing or retarding a number of artificial neurons involved. Non-biological modulations may include modifying time constants in the neural device, altering neural state, or modifying the coefficients or neural equations for the neural device.

Training of a neural device 508 involves the device interacting with the world around it. In order to do so, many different types of sensors are typically used by the device to detect contact or proximity with other objects in the training environment. Installation of the various physical sensors to cover the potential impact points is tedious, and calibration of these sensors relative to the effect on the training rate is non-trivial.

By using a logical boundary to determine proximity with other objects in the training environment, the system may use a virtual boundary in lieu of, or as a complement to, multiple sensors for training the neural device. The virtual boundaries may most likely aid in reducing the calibration time and the number of sensors used during training.

Figure 7:
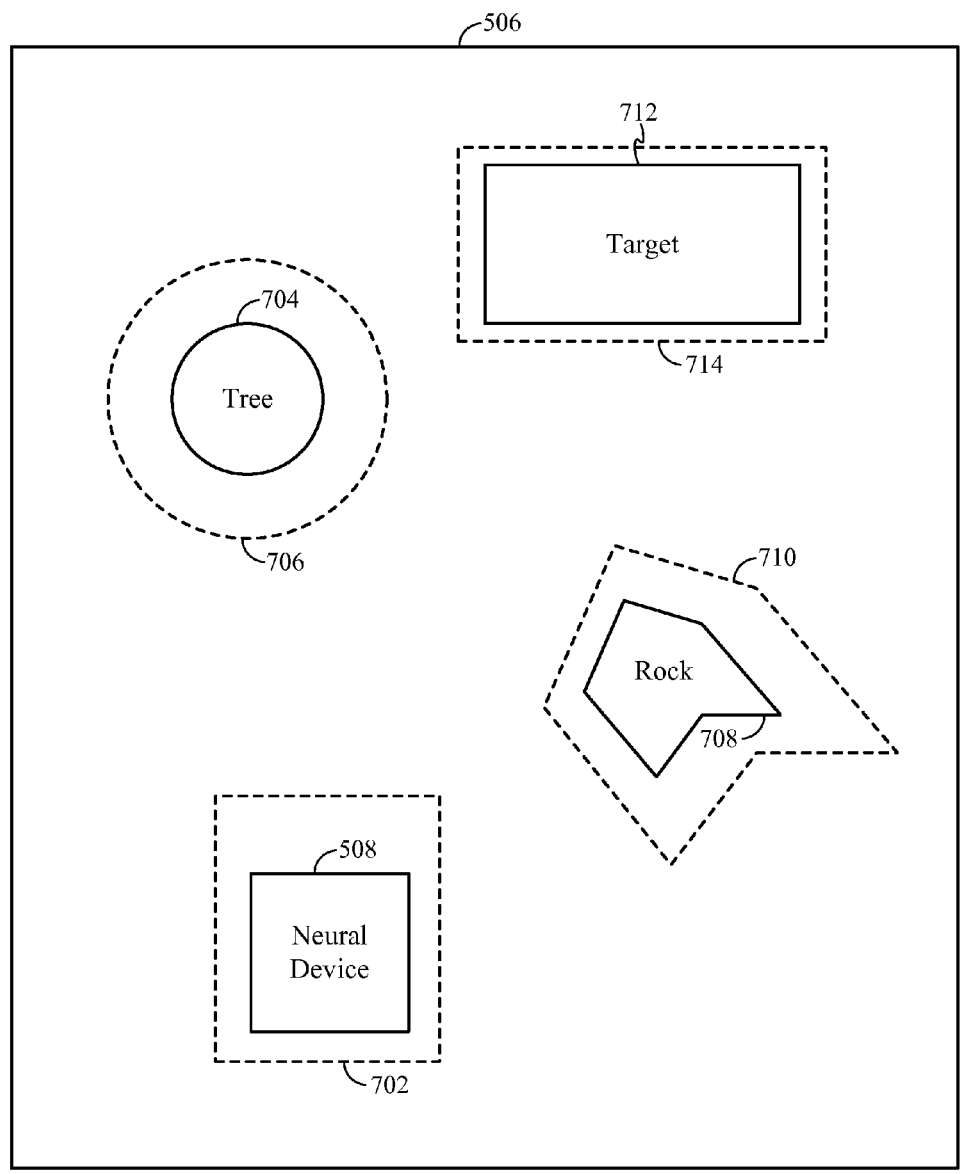
FIG. 7 illustrates an example training environment, where each of the objects located therein has a virtual boundary, in accordance with certain aspects of the present disclosure.

FIG. 7 illustrates an example training environment 506, where each of the objects located therein has a virtual boundary, in accordance with certain aspects of the present disclosure. For example, the neural device 508 has a device virtual boundary 702. Similarly, a tree 704 has a tree virtual boundary 706, and a rock 708 has a rock virtual boundary 710. For certain aspects, the target 712 may also have a target virtual boundary 714.

The system may leverage virtual boundaries to more effectively modulate the learning rate. A virtual boundary is a logical boundary that surrounds at least a portion of the neural device (in one, two, or three dimensions) and may wrap entities (rocks 708, trees 704, targets 712, etc.) present in the environment (in a similar or different manner than the neural device 508) during training Virtual boundaries and entities in the environment may be assigned labels. Virtual boundaries and entities in the environment may be assigned weights in a uniform or non-uniform distribution across the areas (or volumes) they contain.

To train the neural device 508, the device is placed in a training environment 506 (i.e., a training field). Each of the device and other objects (e.g., trees, rocks, and a target) in the field are surrounded by a virtual boundary, as illustrated in FIG. 7. The virtual boundaries may be created and managed by the training processing system 504 When virtual boundaries make contact, the neural device 508 adjusts its learning rate (or, more specifically, the REM 606 may modulate the learning rate of the device) and may change its operation. Virtual boundary shapes may or may not conform to the shape of the device or object. For example, the virtual boundaries in FIG. 7 all conform to the shapes of the objects they surround, whereas the initial device virtual boundary 702 in FIG. 9 does not conform to the shape of the neural device 508.

Figure 8:
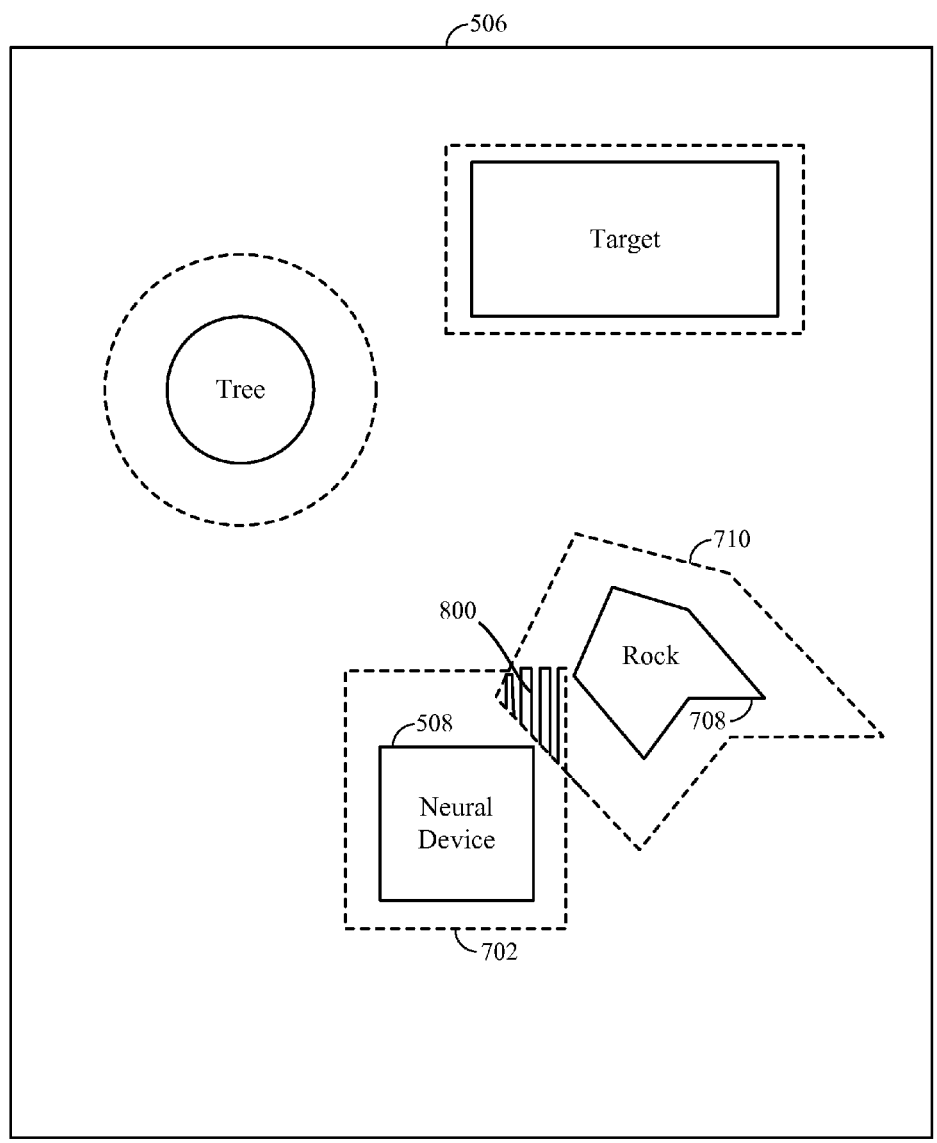
FIG. 8 illustrates example overlapping virtual boundaries in a training environment, in accordance with certain aspects of the present disclosure.

When multiple virtual boundaries overlap, a boundary collision zone 800 is formed, as illustrated in FIG. 8. In FIG. 8, the neural device 508 and the rock 708 have collided logically. The boundary collision zone 800 defines the overlapping boundaries. However, the rock 708 and the device 508 do not touch physically. The learning rate may be adjusted during the collision period (i.e., the duration of the overlapping virtual boundaries). The learning rate may be adjusted relative to the depth, the area, and/or the rate of overlap.

The boundaries of the device and the objects are defined by the training processing system 504 (i.e., the trainer) and are adaptive during the training process. For example, the size of the boundaries may depend on the phase of the training process (e.g., larger boundaries to build enough tolerance in early phases of training, while smaller boundaries are used in later phases). The size may also depend on the number of objects in the training environment 506 or on newly added goals of the learning in subsequent learning phases.

Figure 9:
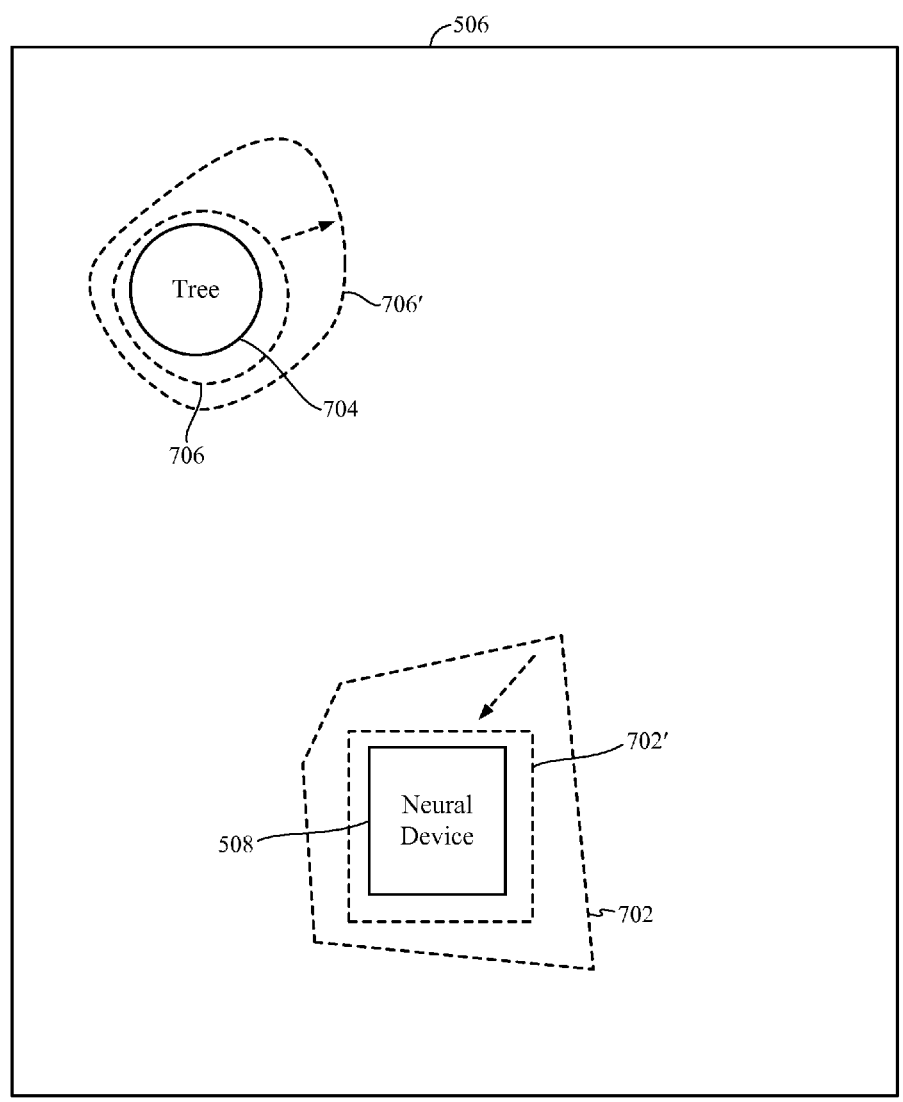
FIG. 9 illustrates example adaptive virtual boundaries, in accordance with certain aspects of the present disclosure.

FIG. 9 illustrates such adaptive virtual boundaries, in accordance with certain aspects of the present disclosure. For example, the tree 704 had an initial tree virtual boundary 706 that generally conformed to the shape of the tree 704. During the training process, however, the tree's virtual boundary was modified, such that the subsequent tree virtual boundary 706' has an increased size and a different shape than the initial tree virtual boundary 706. As another example, the neural device 508 had an initial device virtual boundary 702 that did not conform to the shape of the device. During the training process, however, the device's virtual boundary was adjusted, such that the subsequent device virtual boundary 702' has a decreased size and a shape that generally conforms to the shape of the neural device 508.

For certain aspects, the virtual boundaries may be defined by the learning algorithm of the neural device. For example, the virtual boundaries may be defined depending on the received rewards, on the phase of the training process, or on the real-time errors.

The training system described herein may observe the neural device's interaction with the environment. The system may modify the neural device's internal learning mechanisms (e.g., spike rate, learning rate, neuromodulators, sensor sensitivity, etc.) and/or environmental stimuli (e.g., move a flame closer to the device, make the scene darker, etc.) in an effort to increase the training rate.

Figure 10:
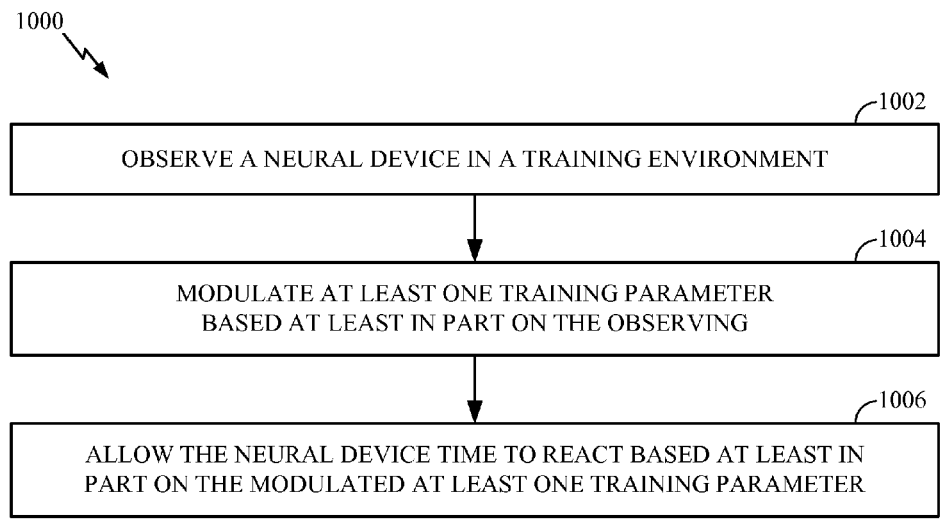
FIG. 10 is a flow diagram of example operations for training a neural device having an artificial nervous system, from the perspective of a training apparatus external to the neural device, in accordance with certain aspects of the present disclosure.
Figure 10A:
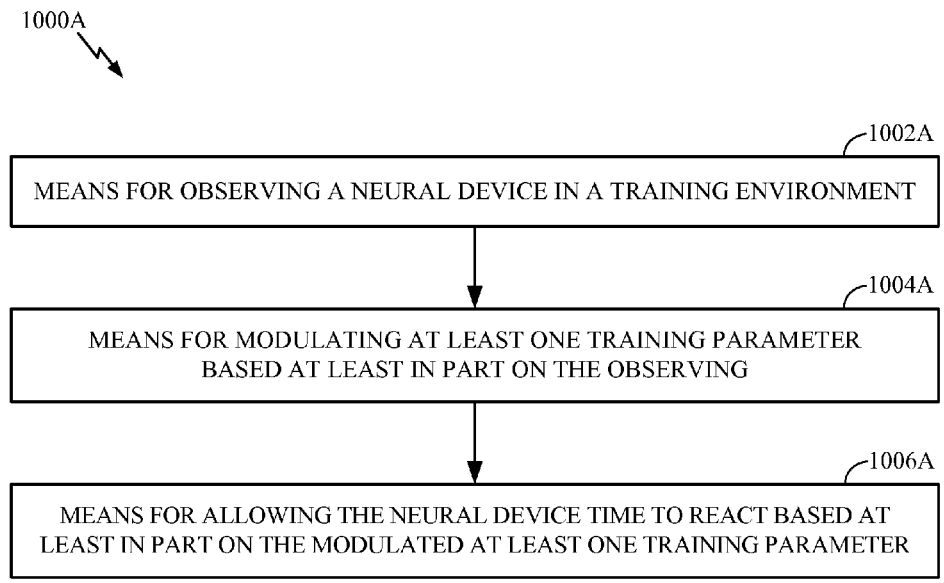
FIG. 10A illustrates example means capable of performing the operations shown in FIG. 10.

FIG. 10 is a flow diagram of example operations 1000 for training a neural device having an artificial nervous system, in accordance with certain aspects of the present disclosure. The operations 1000 may be performed by a training apparatus (e.g., the training processing system) external to the neural device.

The operations 1000 may begin, at 1002, with the training apparatus observing the neural device in a training environment. The observing at 1002 may involve, for example, monitoring at least one of a position, a time, or a velocity of the neural device or one or more objects in the training environment. At 1004, the training apparatus may modulate at least one training parameter based at least in part on the observing at 1002.

According to certain aspects, the operations 1000 may further involve the training apparatus allowing the neural device time to react at 1006, based at least in part on the modulated at least one training parameter. In this case, the operations 1000 may further include the training apparatus repeating the operations at 1002, 1004, and 1006 one or more times (e.g., until the neural device has been sufficiently trained).

According to certain aspects, the at least one training parameter includes at least one environmental factor of the training environment. For certain aspects, the at least one environmental factor is a virtual boundary around an object. In this case, modulating the at least one training parameter at 1004 may involve adjusting at least one of a size or a shape of the virtual boundary around the object. The virtual boundary may conform to a shape of the object or may have a particular standard shape. For certain aspects, the virtual boundary around the object has a noise factor associated therewith. In this case, the operations 1000 may also include the training apparatus adjusting the noise factor associated with the virtual boundary based, at least in part, on the observing at 1002. For certain aspects, modulating the at least one training parameter at 1004 involves adjusting the at least one environmental factor to influence (e.g., augment) sensing by the neural device.

According to certain aspects, the at least one training parameter includes at least one learning factor of the neural device. For certain aspects, the at least one learning factor includes at least one of a spiking rate, a learning rate, an amount or an effect of a neuromodulator, a capacity for synaptic plasticity, a sensitivity of a sensor (associated with the neural device), a gain of a motor control, a gain of a control signal (e.g., for an output component of the neural device, such as a signal controlling the volume of a speaker), a number of artificial neurons involved in the artificial nervous system, or a number of synaptic connections in the artificial nervous system. For certain aspects, the at least one learning factor includes at least one of a time constant in a neural model for the neural device, a state of the neural model (e.g., described by the membrane potential and/or the membrane recovery variable, as described above), one or more coefficients of the neural model, or one or more equations of the neural model.

According to certain aspects, the at least one learning factor includes a virtual boundary around the neural device. In this case, modulating the at least one training parameter at 1004 may include adjusting at least one of a size or a shape of the virtual boundary around the neural device. For certain aspects, the virtual boundary around the neural device may have a uniform spacing from a surface of the neural device, while for other aspects, the virtual boundary may have a non-uniform spacing.

According to certain aspects, modulating the at least one training parameter at 1004 is based at least in part on a depth, an area, a volume, or a rate of overlap between virtual boundaries around the neural device and around an object in the training environment.

According to certain aspects, modulating the at least one training parameter at 1004 includes generating a first reward gain based, at least in part, on at least one of the observing or sensor data from the neural device; and modulating the at least one training parameter based, at least in part, on the first reward gain. For certain aspects, the operations 1000 may further involve receiving a control command and generating a second reward gain based, at least in part, on the control command. In this case, the modulating at 1004 may entail modulating the at least one training parameter based, at least in part, on the first and second reward gains.

According to certain aspects, the operations 1000 may further involve observing another neural device in the same training environment and modulating at least one learning factor of the other neural device based, at least in part, on the observation of the other neural device. In this manner, multiple neural devices may be trained together to perform a single task. For example, four neural devices may be trained to play a song together as a quartet, but each neural device is learning a different instrument (or the portion of the song associated with a different instrument).

Figure 11:
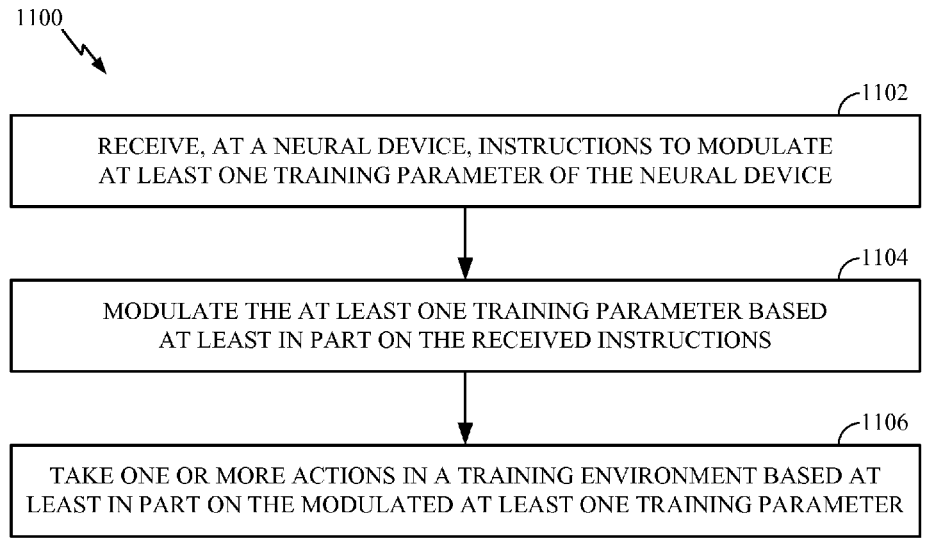
FIG. 11 is a flow diagram of example operations for training a neural device having an artificial nervous system, from the perspective of the neural device, in accordance with certain aspects of the present disclosure.

FIG. 11 is a flow diagram of example operations 1100 for training a neural device having an artificial nervous system, from the perspective of the neural device, in accordance with certain aspects of the present disclosure. The operations 1100 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, etc.

The operations 1100 may begin, at 1102, with the neural device receiving instructions to modulate at least one training parameter of the neural device. At 1104, the neural device may modulate the at least one training parameter based, at least in part, on the received instructions.

According to certain aspects, the operations 1100 may further involve the neural device taking one or more actions in a training environment at 1106, based at least in part on the modulated at least one training parameter.

According to certain aspects, the operations 1100 may also include the neural device sensing data about a training environment. The neural device may then send the data to a training apparatus external to the neural device. For certain aspects, the instructions are received from the training apparatus and may be based, at least in part, on the data sent to the training apparatus.

According to certain aspects, the at least one training parameter may include at least one of a spiking rate, a learning rate, an amount or an effect of a neuromodulator, a capacity for synaptic plasticity, a sensitivity of a sensor (associated with the neural device), a gain of a motor control, a gain of a control signal (e.g., for an output component of the neural device, such as a signal controlling the intensity of a light source), a number of artificial neurons involved in the artificial nervous system, or a number of synaptic connections in the artificial nervous system. For certain aspects, the at least one training parameter comprises at least one of a time constant in a neural model for the neural device, a state of the neural model (e.g., described by the membrane potential and/or the membrane recovery variable, as described above), one or more coefficients of the neural model, or one or more equations of the neural model.

Figure 12:
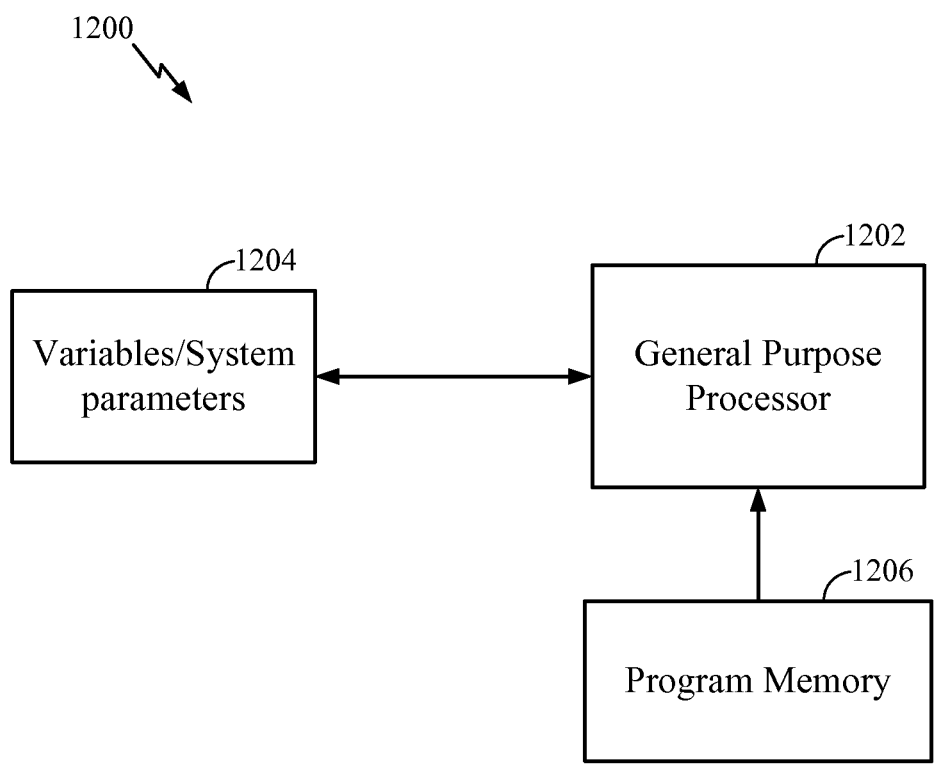
FIG. 12 illustrates an example implementation for training a neural device having an artificial nervous system using a general-purpose processor, in accordance with certain aspects of the present disclosure.
Figure 13:
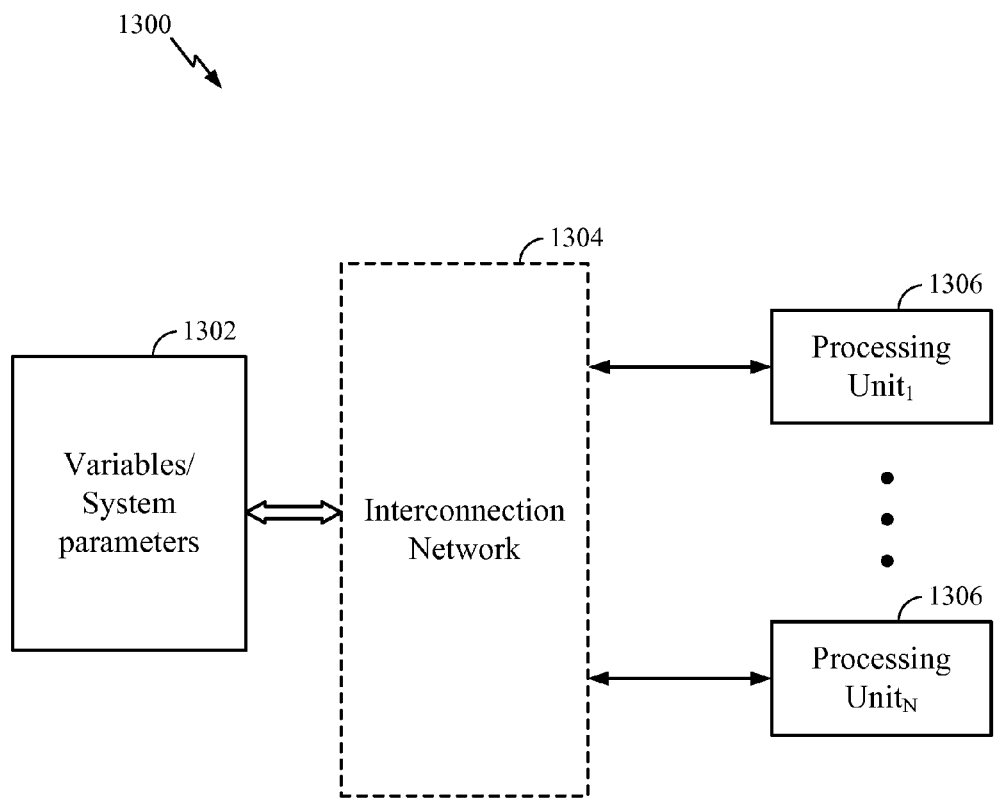
FIG. 13 illustrates an example implementation for training a neural device having an artificial nervous system where a memory may be interfaced with individual distributed processing units, in accordance with certain aspects of the present disclosure.

FIG. 12 illustrates an example block diagram 1200 of the aforementioned method for training a neural device having an artificial nervous system using a general-purpose processor 1202 in accordance with certain aspects of the present disclosure. Variables (neural signals), synaptic weights, and/or system parameters associated with a computational network (neural network) may be stored in a memory block 1204, while instructions related executed at the general-purpose processor 1202 may be loaded from a program memory 1206. In an aspect of the present disclosure, the instructions loaded into the general-purpose processor 1202 may comprise code for observing the neural device in a training environment and code for modulating at least one training parameter based at least in part on the observing. In another aspect of the present disclosure, the instructions loaded into the general-purpose processor 1202 may comprise code for receiving, at a neural device, instructions to modulate at least one training parameter of the neural device and code for modulating the at least one training parameter based at least in part on the received instructions FIG. 13 illustrates an example block diagram 1300 of the aforementioned method for training a neural device having an artificial nervous system where a memory 1302 can be interfaced via an interconnection network 1304 with individual (distributed) processing units (neural processors) 1306 of a computational network (neural network) in accordance with certain aspects of the present disclosure. Variables (neural signals), synaptic weights, and/or system parameters associated with the computational network (neural network) may be stored in the memory 1302, and may be loaded from the memory 1302 via connection(s) of the interconnection network 1304 into each processing unit (neural processor) 1306. In an aspect of the present disclosure, the processing unit 1306 may be configured to observe a neural device in a training environment and to modulate at least one training parameter based at least in part on the observing. In another aspect of the present disclosure, the processing unit 1306 may be configured to receive, at a neural device, instructions to modulate at least one training parameter of the neural device and to modulate the at least one training parameter based at least in part on the received instructions.

Figure 14:
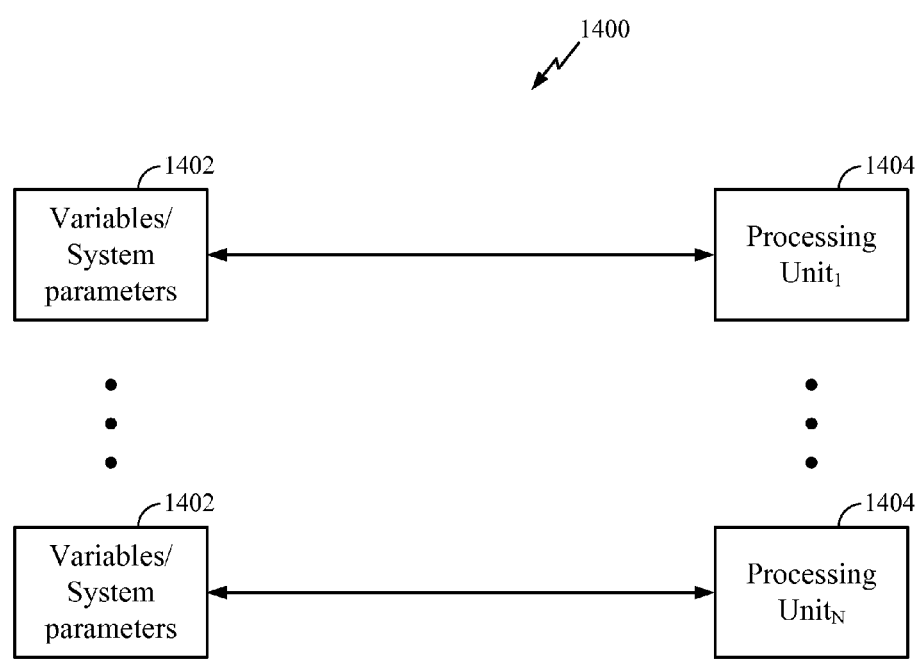
FIG. 14 illustrates an example implementation for training a neural device having an artificial nervous system based on distributed memories and distributed processing units, in accordance with certain aspects of the present disclosure.

FIG. 14 illustrates an example block diagram 1400 of the aforementioned method for training a neural device having an artificial nervous system based on distributed weight memories 1402 and distributed processing units (neural processors) 1404 in accordance with certain aspects of the present disclosure. As illustrated in FIG. 14, one memory bank 1402 may be directly interfaced with one processing unit 1404 of a computational network (neural network), wherein that memory bank 1402 may store variables (neural signals), synaptic weights, and/or system parameters associated with that processing unit (neural processor) 1404. In an aspect of the present disclosure, the processing unit(s) 1404 may be configured to observe a neural device in a training environment and to modulate at least one training parameter based at least in part on the observing. In another aspect of the present disclosure, the processing unit(s) 1404 may be configured to receive, at a neural device, instructions to modulate at least one training parameter of the neural device and to modulate the at least one training parameter based at least in part on the received instructions.

Figure 15:
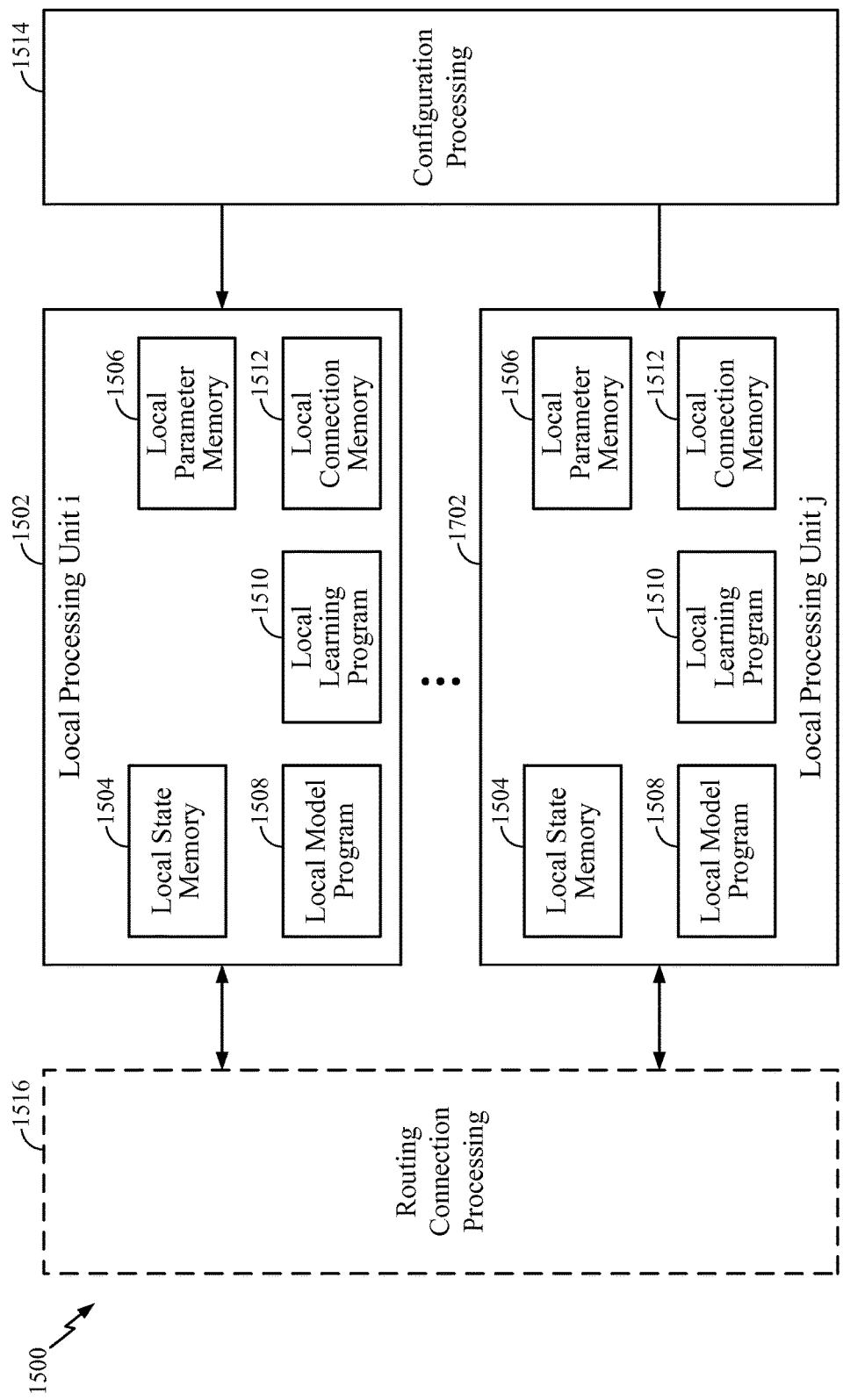
FIG. 15 illustrates an example implementation of a neural network in accordance with certain aspects of the present disclosure.

FIG. 15 illustrates an example implementation of a neural network 1500 in accordance with certain aspects of the present disclosure. As illustrated in FIG. 15, the neural network 1500 may comprise a plurality of local processing units 1502 that may perform various operations of methods described above. Each processing unit 1502 may comprise a local state memory 1504 and a local parameter memory 1506 that store parameters of the neural network. In addition, the processing unit 1502 may comprise a memory 1508 with a local (neuron) model program, a memory 1510 with a local learning program, and a local connection memory 1512. Furthermore, as illustrated in FIG. 15, each local processing unit 1502 may be interfaced with a unit 1514 for configuration processing that may provide configuration for local memories of the local processing unit, and with routing connection processing elements 1516 that provide routing between the local processing units 1502.

According to certain aspects of the present disclosure, each local processing unit 1502 may be configured to determine parameters of the neural network based upon desired one or more functional features of the neural network, and develop the one or more functional features towards the desired functional features as the determined parameters are further adapted, tuned and updated.

Figure 11A:
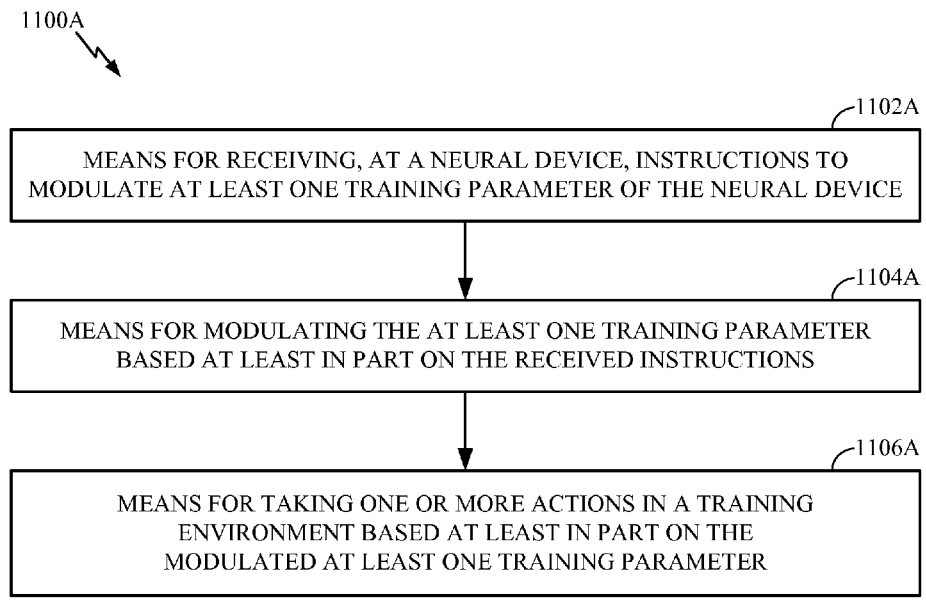
FIG. 11A illustrates example means capable of performing the operations shown in FIG. 11.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 12-15. Generally, where there are operations illustrated in figures, those operations may have corresponding counterpart means-plus-function components with similar numbering. For example, operations 1100 illustrated in FIG. 11 correspond to means 1100A illustrated in FIG. 11A.

For example, means for displaying may include a display (e.g., a monitor, flat screen, touch screen, and the like), a printer, or any other suitable means for outputting data for visual depiction (e.g., a table, chart, or graph). Means for processing, means for observing, means for modulating, means for repeating, means for allowing time, means for receiving, means for sending, means for generating, means for taking one or more actions, means for adjusting, means for sending data, or means for determining may comprise a processing system, which may include one or more processors or processing units. Means for sensing may include a sensor. Means for storing may include a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for training a neural device having an artificial nervous system with an apparatus external to the neural device, comprising:
   observing, with the apparatus, the neural device in a training environment; and
   modulating, with the apparatus, at least one training parameter based at least in part on the observing, wherein:
      the at least one training parameter comprises at least one of a virtual boundary around an object in the training environment or a virtual boundary around the neural device;
      the virtual boundary around the object is greater than an actual boundary of the object; and
      the virtual boundary around the neural device is greater than an actual boundary of the neural device.

2. The method of claim 1, further comprising:
   allowing the neural device time to react based at least in part on the modulated at least one training parameter.

3. The method of claim 2, further comprising:
   repeating the observing, the modulating, and the allowing one or more times.

4. The method of claim 1, wherein the at least one training parameter comprises at least one environmental factor of the training environment.

5. The method of claim 4, wherein modulating the at least one training parameter comprises adjusting the at least one environmental factor to influence sensing by the neural device.

6. The method of claim 1, wherein modulating the at least one training parameter comprises adjusting at least one of a size or a shape of the virtual boundary around the object.

7. The method of claim 1, wherein the virtual boundary around the object conforms to a shape of the object.

8. The method of claim 1, wherein the virtual boundary around the object has a noise factor associated therewith.

9. The method of claim 8, further comprising:
   adjusting the noise factor associated with the virtual boundary around the object based at least in part on the observing.

10. The method of claim 1, wherein the at least one training parameter comprises at least one learning factor of the neural device.

11. The method of claim 10, wherein the at least one learning factor comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

12. The method of claim 10, wherein the at least one learning factor comprises at least one of a time constant in a neural model for the neural device, a state of the neural model, one or more coefficients of the neural model, or one or more equations of the neural model.

13. The method of claim 1, wherein the virtual boundary around the neural device has uniform spacing from a surface of the neural device.

14. The method of claim 1, wherein modulating the at least one training parameter comprises adjusting at least one of a size or a shape of the virtual boundary around the neural device.

15. The method of claim 1, wherein modulating the at least one training parameter is based at least in part on a depth, an area, a volume, or a rate of overlap between the virtual boundaries around the neural device and around the object in the training environment.

16. The method of claim 1, wherein modulating the at least one training parameter comprises:
generating a first reward gain based at least in part on at least one of the observing or sensor data from the neural device; and
modulating the at least one training parameter based at least in part on the first reward gain.

17. The method of claim 16, further comprising:
receiving a control command; and
generating a second reward gain based at least in part on the control command, wherein the modulating comprises modulating the at least one training parameter based at least in part on the first and second reward gains.

18. The method of claim 1, wherein the observing comprises monitoring at least one of a position, a time, or a velocity of the neural device or one or more objects in the training environment.

19. The method of claim 1, further comprising:
observing another neural device in the same training environment; and
modulating at least one learning factor of the other neural device based at least in part on the observation of the other neural device.

20. An apparatus for training a neural device having an artificial nervous system, comprising:
a processing system configured to:
observe the neural device in a training environment; and
modulate at least one training parameter based at least in part on the observing, wherein:
the at least one training parameter comprises at least one of a virtual boundary around an object in the training environment or a virtual boundary around the neural device;
the virtual boundary around the object is greater than an actual boundary of the object; and
the virtual boundary around the neural device is greater than an actual boundary of the neural device; and
a memory coupled to the processing system.

21. The apparatus of claim 20, wherein the processing system is further configured to allow the neural device time to react based at least in part on the modulated at least one training parameter.

22. The apparatus of claim 21, wherein the processing system is further configured to repeat the observing, the modulating, and the allowing one or more times.

23. The apparatus of claim 20, wherein the at least one training parameter comprises at least one environmental factor of the training environment.

24. The apparatus of claim 23, wherein the processing system is configured to modulate the at least one training parameter by adjusting at least one environmental factor to influence sensing by the neural device.

25. The apparatus of claim 20, wherein the processing system is configured to modulate the at least one training parameter by adjusting at least one of a size or a shape of the virtual boundary around the object.

26. The apparatus of claim 20, wherein the virtual boundary around the object conforms to a shape of the object.

27. The apparatus of claim 20, wherein the virtual boundary around the object has a noise factor associated therewith.

28. The apparatus of claim 27, wherein the processing system is further configured to adjust the noise factor associated with the virtual boundary around the object based at least in part on the observing.

29. The apparatus of claim 20, wherein the at least one training parameter comprises at least one learning factor of the neural device.

30. The apparatus of claim 29, wherein the at least one learning factor comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

31. The apparatus of claim 29, wherein the at least one learning factor comprises at least one of a time constant in a neural model for the neural device, a state of the neural model, one or more coefficients of the neural model, or one or more equations of the neural model.

32. The apparatus of claim 20, wherein the virtual boundary around the neural device has uniform spacing from a surface of the neural device.

33. The apparatus of claim 20, wherein the processing system is configured to modulate the at least one training parameter by adjusting at least one of a size or a shape of the virtual boundary around the neural device.

34. The apparatus of claim 20, wherein the processing system is configured to modulate the at least one training parameter based at least in part on a depth, an area, a volume, or a rate of overlap between virtual boundaries around the neural device and around the object in the training environment.

35. The apparatus of claim 20, wherein the processing system is configured to modulate the at least one training parameter by:
generating a first reward gain based at least in part on at least one of the observing or sensor data from the neural device; and
modulating the at least one training parameter based at least in part on the first reward gain.

36. The apparatus of claim 35, wherein the processing system is further configured to:
receive a control command; and
generate a second reward gain based at least in part on the control command, wherein the processing system is configured to modulate the at least one training parameter based at least in part on the first and second reward gains.

37. The apparatus of claim 20, wherein the processing system is configured to observe the neural device by monitoring at least one of a position, a time, or a velocity of the neural device or one or more objects in the training environment.

38. The apparatus of claim 20, wherein the processing system is further configured to:
observe another neural device in the same training environment; and modulate at least one learning factor of the other neural device based at least in part on the observation of the other neural device.

39. An apparatus for training a neural device having an artificial nervous system, comprising:
means for observing the neural device in a training environment; and
means for modulating at least one training parameter based at least in part on the observing, wherein:
the at least one training parameter comprises at least one of a virtual boundary around an object in the training environment or a virtual boundary around the neural device:
the virtual boundary around the object is greater than an actual boundary of the object; and
the virtual boundary around the neural device is greater than an actual boundary of the neural device.

40. The apparatus of claim 39, further comprising:
means for allowing the neural device time to react based at least in part on the modulated at least one training parameter.

41. The apparatus of claim 40, further comprising:
means for repeating the observing, the modulating, and the allowing one or more times.

42. The apparatus of claim 39, wherein the at least one training parameter comprises at least one environmental factor of the training environment.

43. The apparatus of claim 42, wherein the means for modulating the at least one training parameter is configured to adjust the at least one environmental factor to influence sensing by the neural device.

44. The apparatus of claim 39, wherein the means for modulating the at least one training parameter is configured to adjust at least one of a size or a shape of the virtual boundary around the object.

45. The apparatus of claim 39, wherein the virtual boundary around the object conforms to a shape of the object.

46. The apparatus of claim 39, wherein the virtual boundary around the object has a noise factor associated therewith.

47. The apparatus of claim 46, further comprising:
means for adjusting the noise factor associated with the virtual boundary around the object based at least in part on the observing.

48. The apparatus of claim 39, wherein the at least one training parameter comprises at least one learning factor of the neural device.

49. The apparatus of claim 48, wherein the at least one learning factor comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

50. The apparatus of claim 48, wherein the at least one learning factor comprises at least one of a time constant in a neural model for the neural device, a state of the neural model, one or more coefficients of the neural model, or one or more equations of the neural model.

51. The apparatus of claim 39, wherein the virtual boundary around the neural device has uniform spacing from a surface of the neural device.

52. The apparatus of claim 39, wherein the means for modulating the at least one training parameter is configured to adjust at least one of a size or a shape of the virtual boundary around the neural device.

53. The apparatus of claim 39, wherein the means for modulating the at least one training parameter is configured to modulate the at least one training parameter based at least in part on a depth, an area, a volume, or a rate of overlap between virtual boundaries around the neural device and around the object in the training environment.

54. The apparatus of claim 39, wherein the means for modulating the at least one training parameter is configured to:
generate a first reward gain based at least in part on at least one of the observing or sensor data from the neural device; and
modulate the at least one training parameter based at least in part on the first reward gain.

55. The apparatus of claim 54, further comprising:
means for receiving a control command; and
means for generating a second reward gain based at least in part on the control command, wherein the means for modulating is configured to modulate the at least one training parameter based at least in part on the first and second reward gains.

56. The apparatus of claim 39, wherein the means for observing is configured to monitor at least one of a position, a time, or a velocity of the neural device or one or more objects in the training environment.

57. The apparatus of claim 39, further comprising:
means for observing another neural device in the same training environment; and
means for modulating at least one learning factor of the other neural device based at least in part on the observation of the other neural device.

58. A non-transitory computer-readable medium for training a neural device having an artificial nervous system with an apparatus external to the neural device, the non-transitory computer-readable medium having instructions executable to:
observe, with the apparatus, the neural device in a training environment; and
modulate, with the apparatus, at least one training parameter based at least in part on the observing, wherein:
the at least one training parameter comprises at least one of a virtual boundary around an object in the training environment or a virtual boundary around the neural device;
the virtual boundary around the object is greater than an actual boundary of the object; and
the virtual boundary around the neural device is greater than an actual boundary of the neural device.

59. The computer-readable medium of claim 58, further comprising instructions executable to:
allow the neural device time to react based at least in part on the modulated at least one training parameter.

60. The computer-readable medium of claim 59, further comprising instructions executable to:
repeat the observing, the modulating, and the allowing one or more times.

61. The computer-readable medium of claim 58, wherein the at least one training parameter comprises at least one environmental factor of the training environment.

62. The computer-readable medium of claim 61, wherein modulating the at least one training parameter comprises adjusting the at least one environmental factor to influence sensing by the neural device.

63. The computer-readable medium of claim 58, wherein modulating the at least one training parameter comprises adjusting at least one of a size or a shape of the virtual boundary around the object.

64. The computer-readable medium of claim 58, wherein the virtual boundary around the object conforms to a shape of the object.

65. The computer-readable medium of claim 58, wherein the virtual boundary around the object has a noise factor associated therewith.

66. The computer-readable medium of claim 65, further comprising instructions executable to:
adjust the noise factor associated with the virtual boundary around the object based at least in part on the observing.

67. The computer-readable medium of claim 58, wherein the at least one training parameter comprises at least one learning factor of the neural device.

68. The computer-readable medium of claim 67, wherein the at least one learning factor comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

69. The computer-readable medium of claim 67, wherein the at least one learning factor comprises at least one of a time constant in a neural model for the neural device, a state of the neural model, one or more coefficients of the neural model, or one or more equations of the neural model.

70. The computer-readable medium of claim 58, wherein the virtual boundary around the neural device has uniform spacing from a surface of the neural device.

71. The computer-readable medium of claim 58, wherein modulating the at least one training parameter comprises adjusting at least one of a size or a shape of the virtual boundary around the neural device.

72. The computer-readable medium of claim 58, wherein modulating the at least one training parameter is based at least in part on a depth, an area, a volume, or a rate of overlap between virtual boundaries around the neural device and around the object in the training environment.

73. The computer-readable medium of claim 58, wherein modulating the at least one training parameter comprises:
generating a first reward gain based at least in part on at least one of the observing or sensor data from the neural device; and
modulating the at least one training parameter based at least in part on the first reward gain.

74. The computer-readable medium of claim 73, further comprising instructions executable to:
receive a control command; and
generate a second reward gain based at least in part on the control command, wherein the modulating comprises modulating the at least one training parameter based at least in part on the first and second reward gains.

75. The computer-readable medium of claim 58, wherein the observing comprises monitoring at least one of a position, a time, or a velocity of the neural device or one or more objects in the training environment.

76. The computer-readable medium of claim 58, further comprising instructions executable to:
observe another neural device in the same training environment; and
modulate at least one learning factor of the other neural device based at least in part on the observation of the other neural device.

77. A method for training a neural device having an artificial nervous system, comprising:

receiving, at the neural device, instructions to modulate at least one training parameter of the neural device, wherein:
at least one of the neural device or an object disposed in a training environment for training the neural device has a virtual boundary associated therewith that is greater than an actual boundary of the at least one of the neural device or the object; and
the received instructions are based at least in part on a collision with the virtual boundary; and
modulating the at least one training parameter based at least in part on the received instructions.

78. The method of claim 77, further comprising:
taking one or more actions in the training environment based at least in part on the modulated at least one training parameter.

79. The method of claim 77, further comprising:
sensing, at the neural device, data about the training environment; and
sending the data to a training apparatus external to the neural device.

80. The method of claim 79, wherein the instructions are received from the training apparatus.

81. The method of claim 77, wherein the at least one training parameter comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

82. The method of claim 77, wherein the at least one training parameter comprises at least one of a time constant in a neural model for the neural device, a state of the neural model, one or more coefficients of the neural model, or one or more equations of the neural model.

83. An apparatus having an artificial nervous system, comprising:
a processing system configured to:
receive instructions to modulate at least one training parameter of the apparatus, wherein:
at least one of the apparatus or an object disposed in a training environment for training the apparatus has a virtual boundary associated therewith that is greater than an actual boundary of the at least one of the apparatus or the object and
the received instructions are based at least in part on a collision with the virtual boundary; and
modulate the at least one training parameter based at least in part on the received instructions; and
a memory coupled to the processing system.

84. The apparatus of claim 83, wherein the processing system is further configured to take one or more actions in the training environment based at least in part on the modulated at least one training parameter.

85. The apparatus of claim 83, wherein the processing system is further configured to:
sense data about the training environment; and
send the data to a training apparatus.

86. The apparatus of claim 85, wherein the instructions are received from the training apparatus.

87. The apparatus of claim 83, wherein the at least one training parameter comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

88. The apparatus of claim 83, wherein the at least one training parameter comprises at least one of a time constant in a neural model for the apparatus, a state of the neural model, one or more coefficients of the neural model, or one or more equations of the neural model.

89. An apparatus having an artificial nervous system, comprising:
means for receiving instructions to modulate at least one training parameter of the apparatus, wherein:
at least one of the apparatus or an object disposed in a training environment for training the apparatus has a virtual boundary associated therewith that is greater than an actual boundary of the at least one of the apparatus or the object; and
the received instructions are based at least in part on a collision with the virtual boundary; and
means for modulating the at least one training parameter based at least in part on the received instructions.

90. The apparatus of claim 89, further comprising:
means for taking one or more actions in the training environment based at least in part on the modulated at least one training parameter.

91. The apparatus of claim 89, further comprising:
means for sensing data about the training environment; and
means for sending the data to a training apparatus.

92. The apparatus of claim 91, wherein the instructions are received from the training apparatus.

93. The apparatus of claim 89, wherein the at least one training parameter comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

94. The apparatus of claim 89, wherein the at least one training parameter comprises at least one of a time constant in a neural model for the apparatus, a state of the neural model, one or more coefficients of the neural model, or one or more equations of the neural model.

95. A non-transitory computer-readable medium for training a neural device having an artificial nervous system, the non-transitory computer-readable medium having code for:
receiving, at the neural device, instructions to modulate at least one training parameter of the neural device, wherein:
at least one of the neural device or an object disposed in a training environment for training the neural device has a virtual boundary associated therewith that is greater than an actual boundary of the at least one of the neural device or the object; and
the received instructions are based at least in part on a collision with the virtual boundary; and
modulating the at least one training parameter based at least in part on the received instructions.

96. The computer-readable medium of claim 95, further comprising code for:
taking one or more actions in the training environment based at least in part on the modulated at least one training parameter.

97. The computer-readable medium of claim 95, further comprising code for:
sensing, at the neural device, data about the training environment; and
sending the data to a training apparatus external to the neural device.

98. The computer-readable medium of claim 97, wherein the instructions are received from the training apparatus.

99. The computer-readable medium of claim 95, wherein the at least one training parameter comprises at least one of a spiking rate, a learning rate, an amount or an effect of a neuromodulator, a capacity for synaptic plasticity, a sensitivity of a sensor, a gain of a motor control, a gain of a control signal, a number of artificial neurons involved in the artificial nervous system, or a number of synaptic connections in the artificial nervous system.

100. The computer-readable medium of claim 95, wherein the at least one training parameter comprises at least one of a time constant in a neural model for the neural device, a state of the neural model, one or more coefficients of the neural model, or one or more equations of the neural model.

* * * * *